US009827892B2

United States Patent
Carr et al.

(10) Patent No.: US 9,827,892 B2
(45) Date of Patent: Nov. 28, 2017

(54) DEPLOYABLE SEAT COVER

(71) Applicant: Who-Rae Australia, LLC, Compton, CA (US)

(72) Inventors: Jason David Carr, Bentleigh East (AU); Mark Rayman Pawsey, Hawthorn East (AU)

(73) Assignee: Who-Rae Australia, LLC, Compton, CA (US)

( * ) Notice: Subject to any disclaimer, the term of this patent is extended or adjusted under 35 U.S.C. 154(b) by 50 days.

(21) Appl. No.: 14/980,457

(22) Filed: Dec. 28, 2015

(65) Prior Publication Data
US 2017/0144575 A1  May 25, 2017

(51) Int. Cl.
| | |
|---|---|
| *A47C 31/00* | (2006.01) |
| *B60N 2/60* | (2006.01) |
| A47C 31/11 | (2006.01) |
| B60N 2/28 | (2006.01) |
| A47C 31/02 | (2006.01) |

(52) U.S. Cl.
CPC ......... *B60N 2/6027* (2013.01); *B60N 2/6036* (2013.01); *A47C 31/006* (2013.01); *A47C 31/02* (2013.01); *A47C 31/023* (2013.01); *A47C 31/11* (2013.01); *B60N 2/28* (2013.01); *B60N 2/2881* (2013.01)

(58) Field of Classification Search
CPC ...... B60N 2/28; B60N 2/6036; B60N 2/2881; A47C 31/11; A47C 31/006; A47C 31/02; A47C 31/023
USPC ............................. 297/219.1, 219.12, 228.13
See application file for complete search history.

(56) References Cited

U.S. PATENT DOCUMENTS

| | | | | | |
|---|---|---|---|---|---|
| 4,195,378 | A | * | 4/1980 | Parker ...................... | A45C 3/10 190/2 |
| 5,275,463 | A | * | 1/1994 | Rocha ..................... | A47C 31/11 297/188.01 |
| 5,441,789 | A | * | 8/1995 | Walker ................... | A47C 1/143 297/223 |
| 5,605,374 | A | * | 2/1997 | Perry ..................... | A47C 7/546 297/227 |
| 5,906,413 | A | * | 5/1999 | Yang ...................... | A47C 7/425 297/219.1 |

(Continued)

*Primary Examiner* — Chi Q Nguyen
(74) *Attorney, Agent, or Firm* — Wood Herron & Evans LLP

(57) ABSTRACT

A deployable seat cover for a vehicular seat having a back rest and a seat cushion includes an outer envelope for accommodating a folded or rolled seat protector sheet therein. The seat protector is secured to the outer envelope, and the outer envelope includes a lower opening though which the seat protector sheet can be deployed. At least one attachment arrangement is secured to an upper portion of the outer envelope for securing the seat cover to the vehicular seat. The deployable seat cover further includes at least one elongate pull member including a fixed end secured to the outer envelope, and a free end extending outside of the outer envelope. The pull member substantially encircles at least an upper portion of the folded or rolled seat protector sheet when accommodated within the outer envelope. The seat protector sheet is deployed from the outer envelope when a pulling force is applied to the free end of the pull member forcing the seat protector sheet out of the lower opening of the outer envelope.

17 Claims, 4 Drawing Sheets

(56) References Cited

U.S. PATENT DOCUMENTS

| | | | | |
|---|---|---|---|---|
| 6,089,659 A * | 7/2000 | Toyota | .................. | A47C 31/11 24/116 A |
| 6,131,995 A * | 10/2000 | Smith | .................. | B60N 2/6063 297/118 |
| 6,135,635 A * | 10/2000 | Miller | .................. | A47C 31/11 224/584 |
| 6,648,410 B2 * | 11/2003 | Sparks | .................. | B60N 2/6036 297/228.1 |
| 6,948,771 B1 * | 9/2005 | Salandy | .................. | A47C 31/11 297/220 |
| 7,695,066 B2 * | 4/2010 | Guercia | .................. | A47C 31/11 297/219.1 |
| 9,278,665 B2 * | 3/2016 | Amirault | .................. | B60R 22/00 |
| 9,402,484 B2 * | 8/2016 | Moore | .................. | A47C 31/11 |

\* cited by examiner

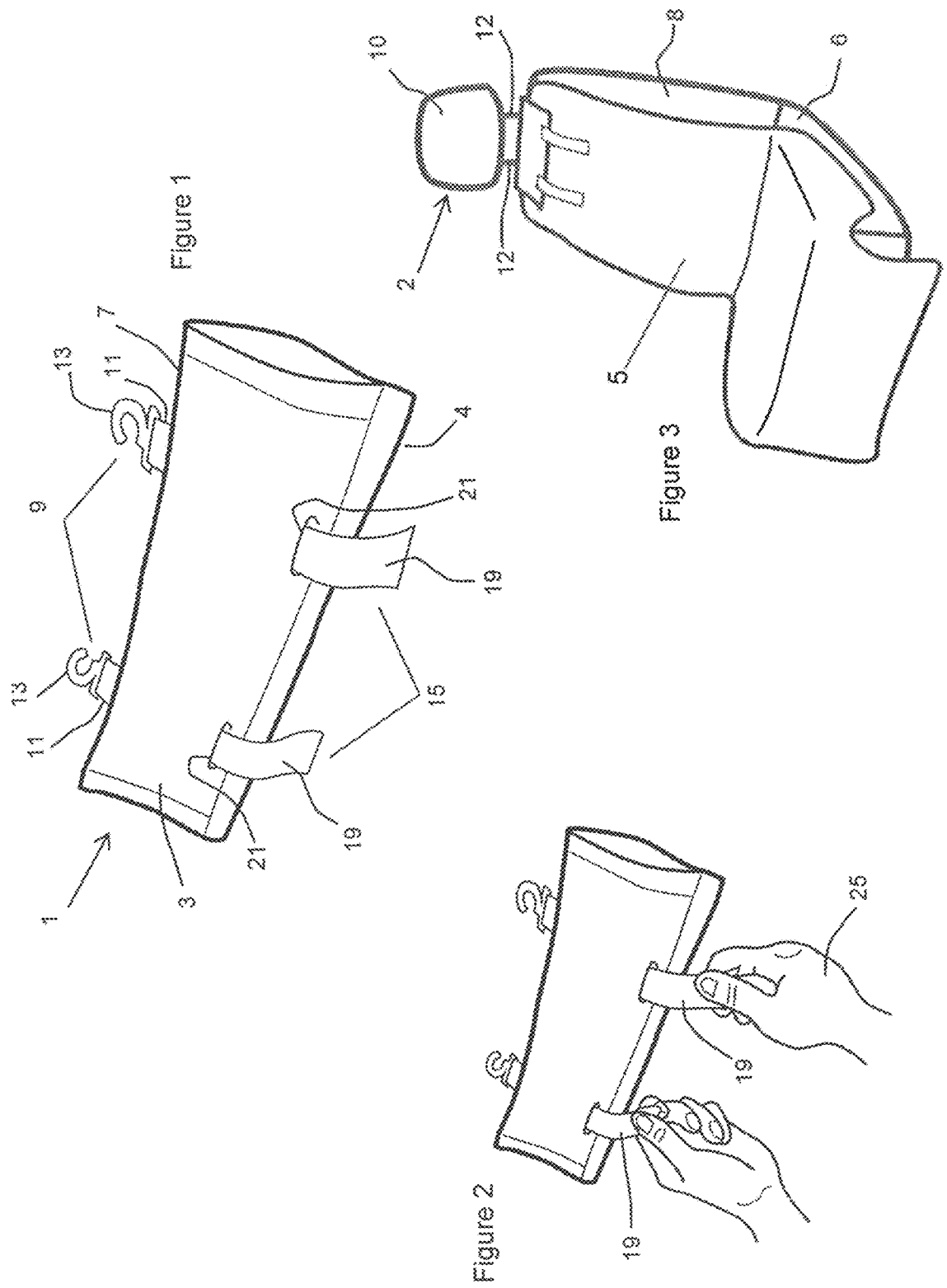

ized orientation. It is to be appreciated that the deployable seat cover could be used in an alternative orientation, and that the present invention is not limited by use of these terms.

DEPLOYABLE SEAT COVER

FIELD OF THE INVENTION

This application claims priority to Australian Patent Application No. 2015261603, the entire contents of which are incorporated herein by reference. The present invention is directed to seat covers for vehicles including cars. While the present invention will be described with reference to car seats, it is to be appreciated that the invention is not limited to this application and that other applications are also envisaged.

BACKGROUND OF THE INVENTION

A well known automotive accessory is the car seat cover. This product is generally used to cover and protect from damage or staining the outer surfaces of a car seat. Car seat covers can also be used for decorative purposes.

These car seat covers are designed to remain permanently on the car seat after installation. However, there are situations where it is not necessary or not desired to have a permanently installed car seat cover. For example, car seat covers are not normally required for leather seats. A person may however wish to temporarily cover the seat if that person is wet, dirty or sweaty, or if that person has pets or needs to put something on the seat that needs to be protected. Another example could be where a tradesman, such as a mechanic, needs to protect the car seat from getting dirty while they are servicing that car.

It would therefore be advantageous to provide a seat cover that does not need to be permanently installed on the seat, and that can easily deployed when used.

It would also be preferably advantageous for that seat cover to be easily and quickly attached to the seat, and small enough in size when packed to be easily stared within the car when not in use.

SUMMARY OF THE INVENTION

With this in mind, the present invention provides a deployable seat cover for a vehicular seat having a back rest and a seat cushion comprising:

an outer envelope for accommodating a folded or rolled seat protector sheet therein, the seat protector sheet being secured to the outer envelope, the outer envelope including a lower opening though which the seat protector sheet can be deployed;

at least one attachment arrangement secured to an upper portion of the outer envelope for securing the seat cover to the vehicular seat; and at least one elongate pull member including a fixed end secured to the outer envelope, and a free end extending outside of the outer envelope, the pull member substantially encircling at least an upper portion of the folded or rolled seat protector sheet when accommodated within the outer envelope;

wherein the seat protector sheet is deployed from the outer envelope when a pulling force is applied to the free end of the pull member forcing the seat protector sheet out of the lower opening of the outer envelope.

The terms 'upper', 'lower' and 'sides' used in the specification relate to the deployable seat cover according to the present invention when positioned in its typical installed orientation. It is to be appreciated that the deployable seat cover could be used in an alternative orientation, and that the present invention is not limited by use of these terms.

The attachment arrangement may allow the deployable seat cover to be quickly secured to the vehicular seat. The seat may typically include a head rest connected via two support rods to the backrest of the seat, and that the attachment arrangement may include two attachment members, each attachment member including at least one hook for engaging a said support rod. Alternatively, the attachment arrangement may include two straps extending from the top portion of the outer envelope, and having a fastening arrangement at respective free ends of the straps to enable the free ends to be joined together. These two straps may extend around and encircle the head rest support rods or the backrest of the seat. The fastening arrangement may include hook and loop fasteners (commonly known as 'Velcro', a registered trade mark of Velcro Industries B.V.) respectively provided at the free end of the straps. Alternatively, the fastening arrangement may include a buckle set respectively provided at the free end of the straps for connecting together the two straps. The use of other fastening attachments is also envisaged.

The outer envelope and the seat protector sheet may be produced from a single sheet of material, with the seat protector sheet, once deployed, having outer dimensions sufficient to cover at least the seat rest and seat cushion of the vehicular seat. It is however also envisaged that the outer envelope and seat protector sheet may be produced separately, and subsequently joined together.

The pull member may be in the form of a strap, and the outer envelope may include an aperture through which the strap can pass. Preferably, two said pull members are located adjacent opposing sides of the deployable seat cover.

The seat protector sheet may preferably include a securing arrangement to secure the seat protector sheet to the car seat and thereby minimise movement of the seat protector sheet once deployed. The securing arrangement may include an anchor member extending from a surface of the seat protector sheet facing the seat. This anchor member may include a tag having an enlargened free end for insertion between the back rest and seat cushion.

The deployable seat cover according to the present invention can be quickly secured to the seat by means of the attachment members, and the seat protector sheet may be quickly deployed from the outer envelope of the seat cover by pulling down on the one or more pull members that are provided. The seat protector sheet may completely cover at least the seat back and seat when fully deployed and can be quickly refolded or rolled and inserted back into the outer envelope when not in use. The deployable seat cover, once packed, may be of a small enough size to be easily stored within the car.

BRIEF DESCRIPTION OF THE DRAWINGS

It will be convenient to further describe the invention with respect to the accompanying drawings which illustrate a preferred embodiment of the deployable seat cover according to the present invention. Other embodiments of the invention are possible, and consequently, the particularity of the accompanying drawings is not to be understood as superseding the generality of the preceding description of the invention.

In the drawings:

FIG. 1 shows a front perspective view of the deployable seat cover according to the present invention;

FIG. 2 shows the deployable seat cover immediately prior to deployment of the seat protector sheet;

FIG. 3 shows the deployable seat cover of FIG. 1 on a car seat with the car protector sheet fully deployed;

DETAILED DESCRIPTION OF THE INVENTION

Figure 4:
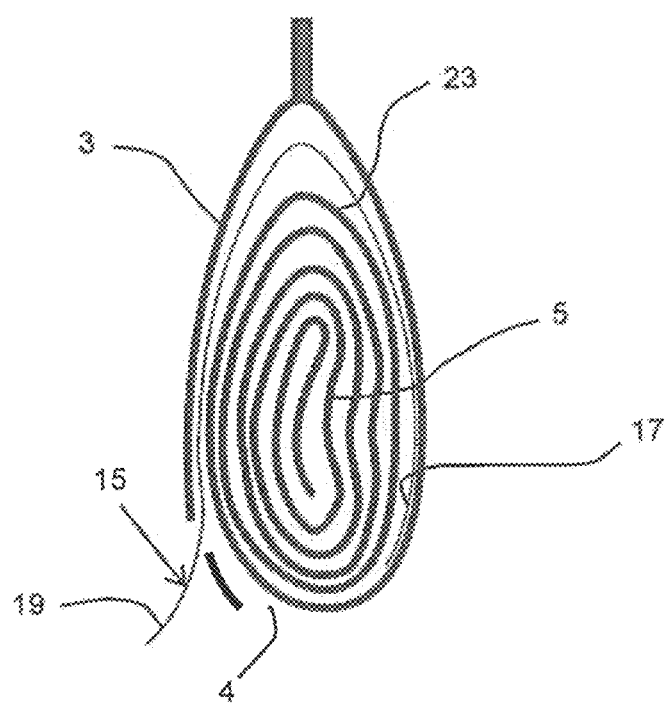
FIG. 4 is a cross-sectional view of the deployable seat cover of FIG. 1 prior to deployment of the seat protector sheet.

FIGS. 1 and 2 show a deployable seat cover 1 according to the present invention when positioned in its typical installed orientation. The deployable seat cover 1 includes an outer envelope 3 within which is located a folded or rolled seat protector sheet 5. The outer envelope 3 and seat protector sheet 5 may be produced from a single sheet of material as best shown in FIG. 4. The seat protector sheet 5 can be deployed through a lower opening 4 of the outer envelope 3.

Attached to an upper portion 7 of the deployable seat cover 1 is a securing arrangement including a pair of attachment members 9. Each attachment member includes a tag 11 secured to the upper portion 7 of the deployable seat cover, and a hook 13 attached to the free end of the tag 11.

The deployable seat cover 1 further includes two pull straps 15. Each pull strap 15 is secured at one end 17 to an inner surface of the outer envelope 3. The free end 19 of the pull strap 15 extends out through apertures 21 provided through the outer envelope 3. As best shown in FIG. 4, the pull strap 15 substantially encircles an upper portion 23 of the folded or rolled sheet protector sheet 5 prior to deployment of that sheet.

FIGS. 2 and 3 show the two stages involved in the deployment of the seat protector sheet 5. The vehicular seat 2 typically includes a seat cushion 6, a back rest 8, and a head rest 10 supported on the back rest 8 by a pair of support rods 12. The hooks 13 provided at the end of each attachment member 9 help to quickly secure the deployable seat cover 1 to each of the support rods 12. The seat protector sheet is deployed by the user 25 applying a pulling force on each of the free ends 19 of the pull straps 15 as shown in FIG. 2. The pull straps 15 urge the rolled or folded seat protector sheet 5 out from the outer envelope 3, the sheet protector sheet can then be unrolled or unfolded and laid over the back rest 8 and seat cushion 6 of the vehicular seat 2 as shown in FIG. 3.

Figure 5:
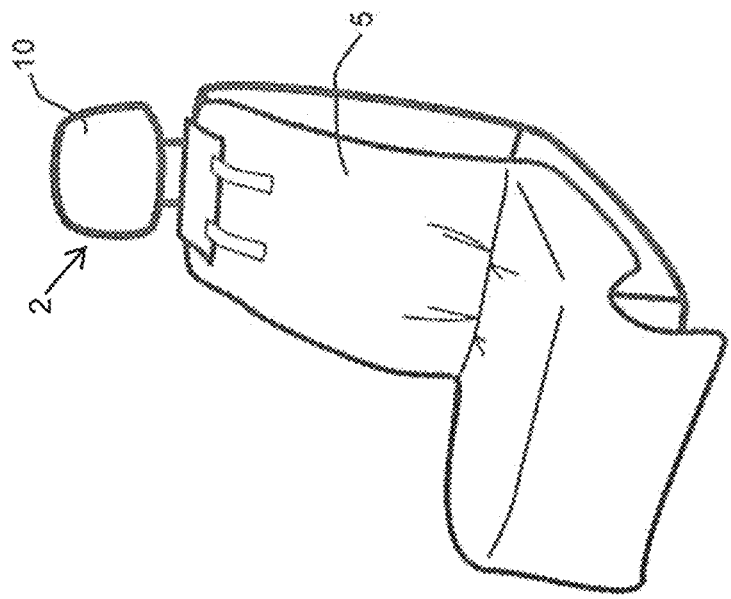
FIG. 5 shows an alternative embodiment of the deployable seat cover according to the present invention in a partially deployed position.
Figure 6:
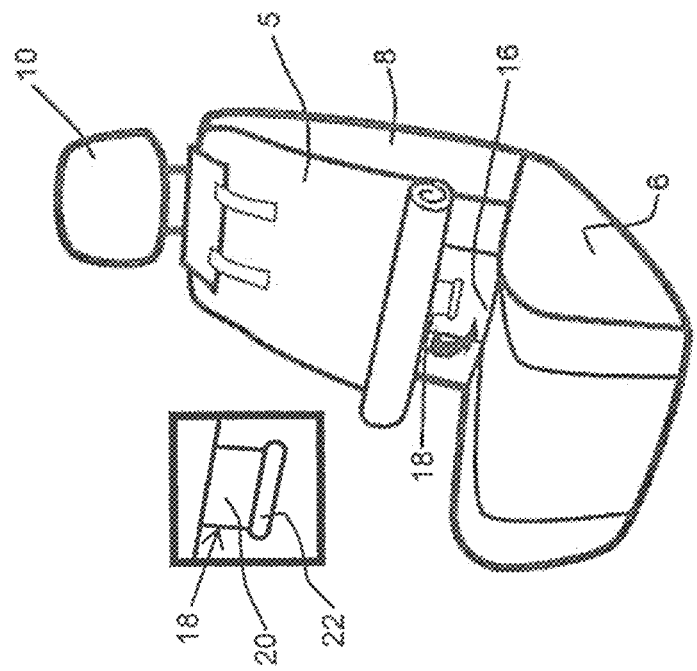
FIG. 6 shows the deployable seat cover of FIG. 5 in a fully deployed position.

FIGS. 5 and 6 show an alternative embodiment of the deployable car seat cover according to the present invention incorporating a securing arrangement for securing in position the seat cover sheet 5 when fully deployed. The same reference numerals are used for features corresponding to the embodiment shown in FIGS. 1 to 4 for clarity reasons. The securing arrangement is in the form of an anchor member 18 provided on the surface of the seal protector sheet 5 facing the vehicular seat 2. The anchor member 18 includes a tag 20 extending from the surface of the seat protector sheet 5. The tag 20 has an enlargened free end 22.

The anchor member 18 is located on the seat protector sheet 5 to be positioned adjacent the junction 16 between the seat rest 8 and seat cushion 6. Therefore, prior to full deployment of the seat protector sheet 5 as shown in FIG. 5, the anchor member 18 can be inserted into the junction 16 to thereby anchor in position the seat protector sheet 5. The seat protector sheet 5 will then be held in position over the seat 2 once fully deployed as shown in FIG. 6.

Figure 7:
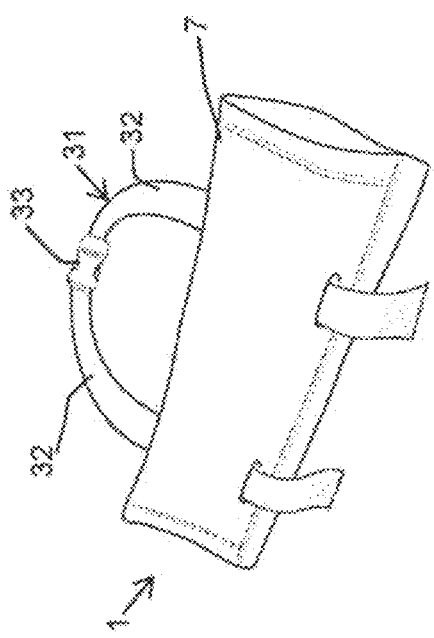
FIG. 7 shows a front perspective view of another embodiment of the deployable seat cover according to the present invention.
Figure 8:
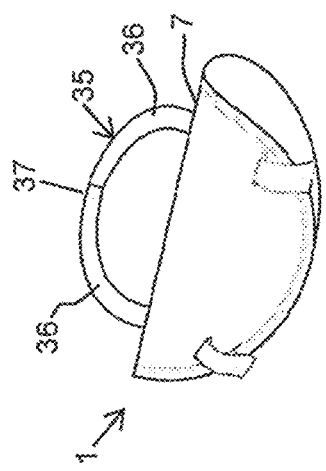
FIG. 8 shows a front perspective view of a further embodiment of the deployable seat cover according to the present invention.

The embodiment of the deployable seat cover shown in FIG. 7 is identical to the embodiment shown in FIGS. 1 to 4 except for the attachment arrangement 35. This attachment arrangement 35 includes a pair of straps 32 extending from the upper portion 7 of the deployable seat cover 1. A buckle set 33 is respectively provided at the free end of each strap 36 to thereby allow the two straps 36 to encircle the support rods 12 and be fastened together thereby securing the deployable seat cover 1 in position on the seat 2. While the embodiment of the deployable seat cover 1 shown in FIG. 8 has a semi-circular outer profile, it otherwise operates in the same manner as the earlier described embodiments. One other difference is that the attachment arrangement 35 includes a pair of straps 36 extending from the top portion 7 of the deployable seat cover 1, the free end of the straps being respectively provided with hook and loop fasteners 37 to allow the free ends of the straps 36 to be fastened together. The straps can encircle the support rods 12 and be fastened in a similar way to the embodiments of FIG. 7.

The deployable car seat cover 1 can be easily stored when not in use by rolling or folding the sheet protector sheet 5 such that it can be reinserted into the outer envelope 3 for subsequent reuse.

Modifications and variations as would be deemed obvious to the person skilled in the art are included within the ambit of the present invention as claimed in the appended claims.

The invention claimed is:

1. A deployable seat cover for a vehicular seat having a back rest and a seat cushion comprising:
    an outer envelope accommodating a folded or rolled seat protector sheet therein, the seat protector sheet being secured to the outer envelope, the outer envelope including a lower opening through which the seat protector sheet can be deployed;
    at least one attachment arrangement secured to an upper portion of the outer envelope and configured to secure the seat cover to the vehicular seat; and
    at least one elongate pull member including a fixed end secured to the outer envelope, and a free end extending outside of the outer envelope, the pull member substantially encircling at least an upper portion of the folded or rolled seat protector sheet when accommodated within the outer envelope;
    the seat protector sheet deployed from the outer envelope by a pulling force applied to the free end of the pull member, thereby forcing the seat protector sheet out of the lower opening of the outer envelope.

2. A deployable seat cover according to claim 1, wherein the attachment arrangement includes two attachment members, each attachment member including at least one hook for engaging the vehicular seat.

3. A deployable seat cover according to claim 1, wherein the attachment arrangement includes two straps extending from the upper portion of the outer envelope, and having a fastening arrangement at respective free ends of the straps and configured to join the free ends together.

4. A deployable seat cover according to claim 3, wherein the fastening arrangement includes hook and loop fasteners respectively provided at the free ends of the straps.

5. A deployable seat cover according to claim 3, wherein the fastening arrangement includes a buckle set respectively provided at the free end of the straps for connecting together the two straps.

6. A deployable seat cover according to claim 1, wherein the outer envelope and the seat protector sheet is produced from a single sheet of material.

7. A deployable seat cover according to claim 1, wherein the seat protector sheet, once deployed, has outer dimensions sufficient to cover at least the back rest and the seat cushion of the vehicular seat.

8. A deployable seat cover according to claim 1, wherein the outer envelope includes at least one aperture, the at least one pull member extending therethrough.

9. A deployable seat cover according to claim 1, wherein the pull member is in the form of a strap.

10. A deployable seat cover according to claim 1, wherein two said pull members are located adjacent opposing sides of the deployable seat cover.

11. A deployable seat cover according to claim 1, further including a securing arrangement for securing the seat protector sheet to the vehicular seat once deployed.

12. A deployable seat cover according to claim 11, wherein the securing arrangement includes an anchor member extending from a surface of the seat protector sheet facing the vehicular seat, the anchor member including a tag having an enlarged free end for insertion between the back rest and the seat cushion.

13. A deployable seat cover for a vehicular seat having a back rest and a seat cushion, the seat cover comprising:

an outer envelope defining an interior portion;

at least one attachment arrangement coupled with the outer envelope and configured to secure the outer envelope to the vehicular seat; and a seat protector sheet coupled with the outer envelope;

the seat protector sheet convertible to and between a first configuration wherein the seat protector sheet is disposed in a stowed condition within the interior portion of the outer envelope, and a second configuration wherein the seat protector sheet extends outwardly from the outer envelope to cover the vehicular seat.

14. The deployable seat cover of claim 13, further comprising:

at least one elongate pull member coupled with the outer envelope, the at least one pull member operative to deploy the seat protector sheet from the first configuration to the second configuration when pulled by a user.

15. The deployable seat cover of claim 14, wherein the at least one elongate pull member has a first, free end and a second, distal end secured to the outer envelope.

16. The deployable seat cover of claim 15, wherein the second end of the at least one elongate pull member is secured within the interior portion of the outer envelope.

17. The deployable seat cover of claim 16, further comprising at least one aperture in the outer envelope, the at least one elongate pull member extending through the at least one aperture such that the first, free end is disposed outside the outer envelope.

* * * * *

UNITED STATES PATENT AND TRADEMARK OFFICE
CERTIFICATE OF CORRECTION

PATENT NO. : 9,827,892 B2
APPLICATION NO. : 14/980457
DATED : November 28, 2017
INVENTOR(S) : Jason David Carr et al.

Page 1 of 1

It is certified that error appears in the above-identified patent and that said Letters Patent is hereby corrected as shown below:

On the Title Page

After (65), insert:
--Foreign Application Priority Data
(30) Nov. 25, 2015 (AU)..........................2015261603--

Signed and Sealed this
Eighteenth Day of September, 2018

Andrei Iancu
*Director of the United States Patent and Trademark Office*